United States Patent
Box

(10) Patent No.: US 9,490,737 B2
(45) Date of Patent: Nov. 8, 2016

(54) WOUND FIELD SYNCHRONOUS MACHINE WITH RESONANT FIELD EXCITER

(71) Applicant: Gary William Box, Golden Valley, MN (US)

(72) Inventor: Gary William Box, Golden Valley, MN (US)

(73) Assignee: GBOX, LLC, Golden Valley, MN (US)

(*) Notice: Subject to any disclaimer, the term of this patent is extended or adjusted under 35 U.S.C. 154(b) by 356 days.

(21) Appl. No.: 14/276,859

(22) Filed: May 13, 2014

(65) Prior Publication Data
US 2015/0333679 A1    Nov. 19, 2015

(51) Int. Cl.
| | |
|---|---|
| *H02P 9/10* | (2006.01) |
| *H02P 9/14* | (2006.01) |
| *H02P 9/30* | (2006.01) |
| *H02P 25/02* | (2016.01) |
| *H02P 11/00* | (2006.01) |
| *H02H 7/06* | (2006.01) |
| *H01F 38/18* | (2006.01) |

(52) U.S. Cl.
CPC ............. *H02P 9/302* (2013.01); *H02P 25/026* (2013.01); *H02P 25/03* (2016.02); *H01F 38/18* (2013.01)

(58) Field of Classification Search
USPC .......................... 322/25, 28, 70, 79; 318/717
See application file for complete search history.

(56) References Cited

U.S. PATENT DOCUMENTS

| | | | |
|---|---|---|---|
| 3,863,137 A * | 1/1975 | Mishima ................. | H02K 19/30 322/25 |
| 4,785,387 A | 11/1988 | Lee et al. | |
| 4,808,868 A | 2/1989 | Roberts | |
| 4,937,508 A * | 6/1990 | Rozman ................. | F02N 11/04 318/400.03 |
| 4,949,021 A * | 8/1990 | Rozman ................. | F02N 11/04 318/400.11 |
| 4,967,132 A * | 10/1990 | Rozman ................. | H02P 1/46 318/723 |
| 5,023,537 A * | 6/1991 | Baits ..................... | H02H 3/32 290/4 R |
| 5,029,263 A * | 7/1991 | Rozman ................. | F02N 11/04 318/400.22 |
| 5,047,699 A * | 9/1991 | Rozman ................. | F02N 11/04 318/400.07 |
| 5,519,275 A | 5/1996 | Scott et al. | |
| 5,587,641 A * | 12/1996 | Rozman ................. | H02P 1/46 318/400.12 |
| 5,594,322 A | 1/1997 | Rozman et al. | |
| 5,608,771 A | 3/1997 | Steigerwald et al. | |
| 5,638,260 A | 6/1997 | Bees | |
| 5,668,458 A | 9/1997 | Ueda et al. | |

(Continued)

FOREIGN PATENT DOCUMENTS

| | | |
|---|---|---|
| WO | 2009147552 A1 | 10/2009 |
| WO | WO2009147552 | 10/2009 |
| WO | 2009147552 A1 | 12/2009 |

OTHER PUBLICATIONS

International Patent Application No. PCT/US2015/029729, International Search Report and Written Opinion mailed Aug. 13, 2015, 10 pages.

*Primary Examiner* — Pedro J Cuevas
(74) *Attorney, Agent, or Firm* — Berggren Law Offices; William R. Berggren; Stephen F. Wolf

(57) ABSTRACT

A brushless field exciter for wound synchronous machines that uses the resonance of the leakage inductance and a capacitor in a resonant field exciter to transfer energy to the rotating field winding. By resonating at frequencies greater than 50 kHz, this exciter reduces the overall size and weight of synchronous wound field motors at all power levels and extends the practical and economic power limits of synchronous wound field machines down to low integral and fractional HP applications, eliminating the permanent magnets now used in high efficiency motors and generators in that power range.

20 Claims, 6 Drawing Sheets

(56) References Cited

U.S. PATENT DOCUMENTS

| | | | |
|---|---|---|---|
| 5,706,184 A | 1/1998 | Mizuta et al. | |
| 5,770,909 A * | 6/1998 | Rosen | H02K 11/042 310/113 |
| 6,249,103 B1 | 6/2001 | Alvaro et al. | |
| 6,292,069 B1 | 9/2001 | Michaels et al. | |
| 7,054,411 B2 | 5/2006 | Katcha et al. | |
| 7,270,017 B2 | 9/2007 | Suzuki et al. | |
| 7,378,814 B2 * | 5/2008 | Gaetani | H02P 6/08 318/700 |
| 7,593,502 B2 | 9/2009 | Katcha et al. | |
| 8,299,762 B2 * | 10/2012 | Rozman | H02M 3/156 318/801 |
| 8,427,096 B2 * | 4/2013 | Bodin | H02P 1/16 318/700 |
| 8,427,116 B2 * | 4/2013 | Rozman | H02M 3/156 322/37 |
| 8,836,293 B1 * | 9/2014 | Rozman | H02P 9/48 322/25 |
| 8,928,293 B1 * | 1/2015 | Rozman | H02P 9/14 290/31 |
| 8,975,876 B2 * | 3/2015 | Rozman | H02P 9/02 322/28 |
| 9,257,889 B2 * | 2/2016 | Rozman | H02P 9/305 |
| 9,325,229 B2 * | 4/2016 | Rozman | H02P 9/48 |
| 2010/0308582 A1 * | 12/2010 | Rozman | H02M 3/156 290/31 |
| 2012/0218069 A1 | 8/2012 | Stancu et al. | |
| 2013/0033038 A1 * | 2/2013 | Rozman | H02M 3/156 290/31 |
| 2016/0197600 A1 * | 7/2016 | Kuznetsov | H03K 3/45 307/106 |

* cited by examiner

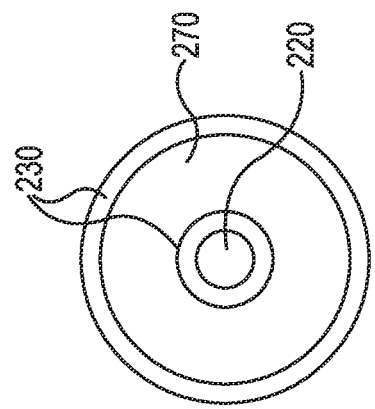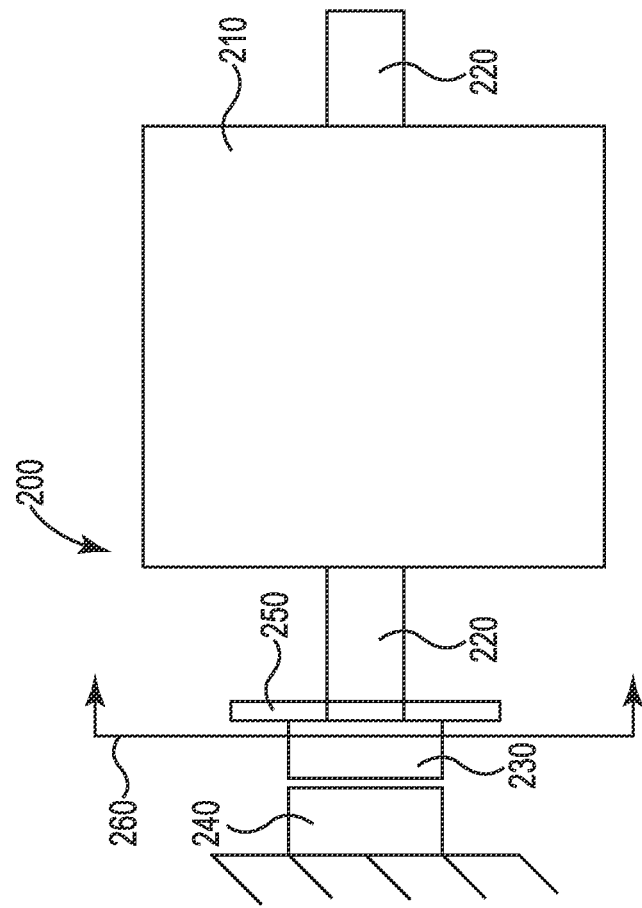

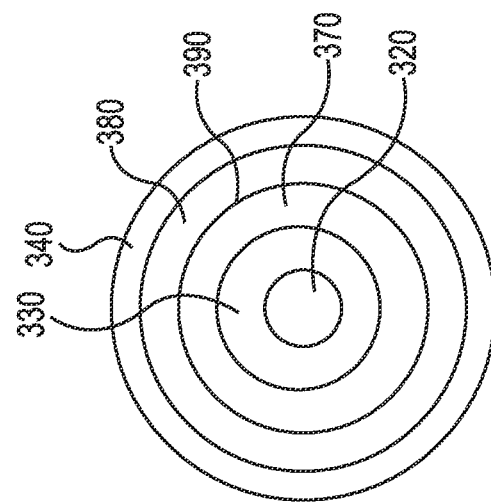
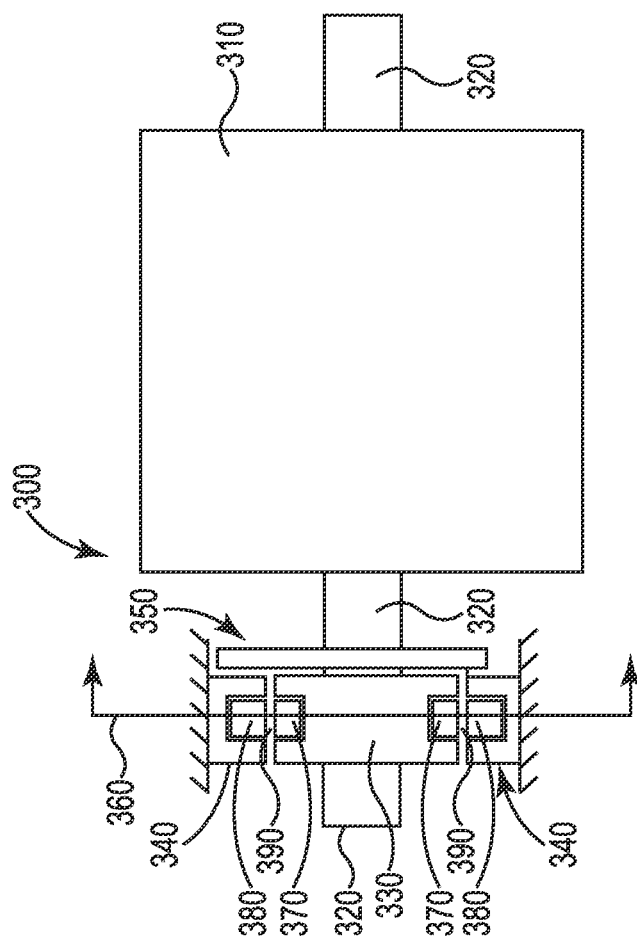

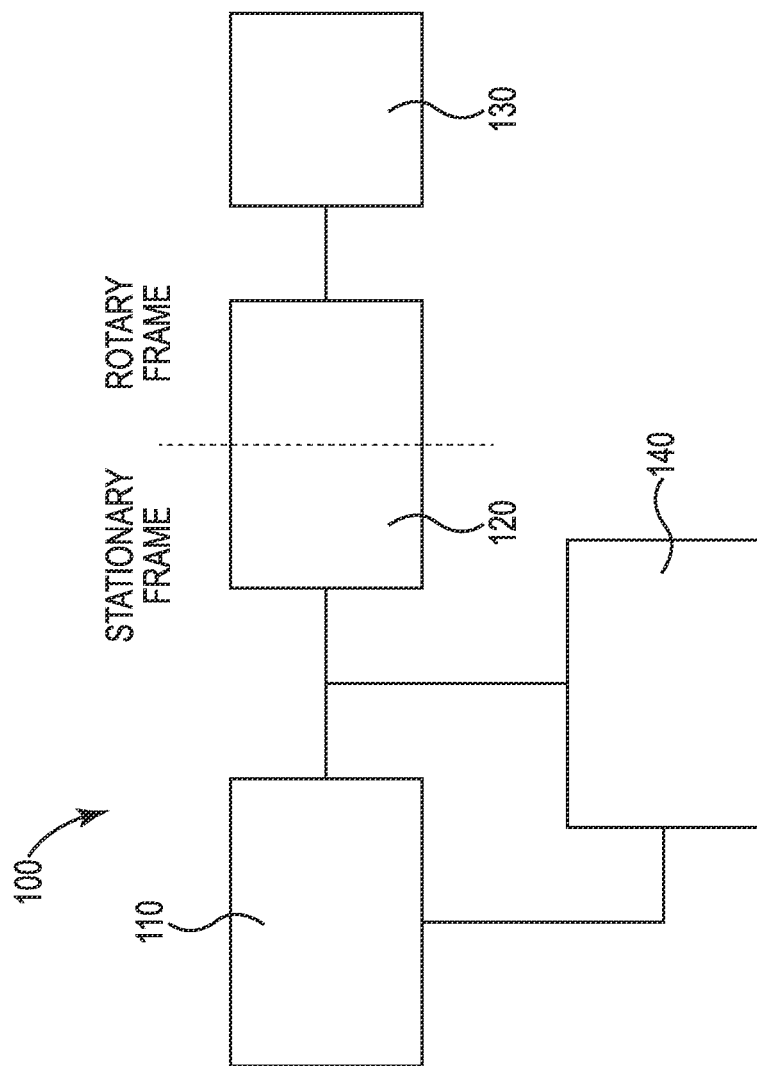

WOUND FIELD SYNCHRONOUS MACHINE WITH RESONANT FIELD EXCITER

FIELD OF THE INVENTION

This invention relates to wound field synchronous machines and methods of operating them efficiently.

BACKGROUND OF THE INVENTION

Electric motors and generators are machines that have been around for a long time. Currently high efficiency large electric machines, i.e., those with a rating of greater than 10 horsepower (HP) and often greater than 100 hp, use wound field synchronous devices with expensive control mechanisms and small machines, i.e., those rated at 10 HP or less, use rare earth rotor magnet devices or induction rotor field devices. Rare earth rotor magnet devices are expected to increase in price in coming years and induction rotor field devices are inefficient energy-wise.

Projected increases in the cost of energy both economically and environmentally, have led to a need for motors and generators that are both low cost and energy efficient.

SUMMARY OF THE INVENTION

This invention addresses that need with a device that allows an efficient wound field synchronous motor or generator to operate in applications with less cost or greater energy efficiency than the permanent magnet or induction motors that are used in those applications currently. It entails three aspects, a machine, a device comprising a rotor winding, and a device able to be attached to a rotor winding. The first aspect is an apparatus that comprises five elements. The first element is a wound field synchronous machine having a rotor winding and having no rotor magnets for torque production. The second element is at least one square wave alternating current (AC) voltage generator having a voltage and driving frequency. The third element is at least one resonant field exciter in communication with the square wave AC generator, the resonant field exciter having (1) a rotary reference frame, (2) a static reference frame, and (3) a resonant circuit comprising in series a resonant capacitor and a rotary transformer with a variable leakage inductance. The resonant field exciter is configured to operate in a resonant mode at a resonant frequency of at least 50 kHz. The fourth element is a controller device in communication with the square wave AC generator and the resonant field exciter and configured to (1) measure the voltage and current into the resonant field exciter, (2) track the resonance frequency, and (3) adjust the driving frequency to substantially match the resonance frequency to maximize AC current transfer. The fifth element is a rectifier in communication with the resonant field exciter and the wound field synchronous machine and configured to convert the AC current to DC current before it goes into the rotor winding of the wound field synchronous machine.

The second aspect is an apparatus that also comprises five elements. The first element is a rotor winding for a wound field synchronous machine. The second element is at least one square wave AC voltage generator having a voltage and driving frequency. The third element is at least one resonant field exciter in communication with the square wave AC generator, the resonant field exciter having (1) a rotary reference frame, (2) a static reference frame, and (3) a resonant circuit comprising in series a resonant capacitor and a rotary transformer with a variable leakage inductance. The resonant field exciter is configured to operate in a resonant mode at a resonant frequency of at least 50 kHz. The fourth element is a controller device in communication with the square wave AC generator and the resonant field exciter and configured to (1) measure the voltage and current into the resonant field exciter, (2) track the resonance frequency, and (3) adjust the driving frequency to substantially match the resonance frequency to maximize AC current transfer. The fifth element is a rectifier in communication with the resonant field exciter and the rotor winding for the wound field synchronous machine and configured to convert the AC current to DC current before it goes into the rotor winding.

The third aspect is an apparatus that comprises four elements. The first element is at least one square wave AC voltage generator having a voltage and driving frequency. The second element is at least one resonant field exciter in communication with the square wave AC generator, the resonant field exciter having (1) a rotary reference frame, (2) a static reference frame, and (3) a resonant circuit comprising in series a resonant capacitor and a rotary transformer with a variable leakage inductance. The resonant field exciter is configured to operate in a resonant mode at a resonant frequency of at least 50 kHz. The third element is a controller device in communication with the square wave AC generator and the resonant field exciter and configured to (1) measure the voltage and current into the resonant field exciter, (2) track the resonance frequency, and (3) adjust the driving frequency to substantially match the resonance frequency to maximize AC current transfer. The forth element is a rectifier in communication with the resonant field exciter and configured to convert the AC current to DC current before it goes into a rotor winding of a wound field synchronous machine.

The various aspects of the invention allow one to make and use a wound field synchronous machine such as a motor or generator in variable speed situations not previously possible that is more efficient than induction machines and does not have expensive rare earth rotor magnets present in permanent magnet machines. The aspects may be used as motors or generators, devices comprising rotor windings that are suitable for easy insertion or retrofitting into existing permanent magnet or induction machines or as devices suitable for use in building new wound field synchronous machines. They may be used in machines ranging from large horsepower machines such as cars to small horsepower machines such as lawnmowers, pumps, and compressors. The machines of the invention and devices of the invention used in machines offer at least five improvements over the current machine technology. First, they extend the practical and economical power limits of synchronous wound field motors and generators down to fractional horsepower applications, eliminating the permanent magnets now used in high efficiency motors in that power range. Second, they enable high efficiency wound field synchronous motors to replace low efficiency induction motors over a broader power range, helping to achieve national energy efficiency goals. Third, they reduce the overall size and weight of synchronous wound field motors at all power levels. Fourth, they provide functions such as field weakening, direct field control, and monitoring not currently available in permanent magnet motor and generator technology. Fifth, they provide nearly the same high efficiency as permanent magnet synchronous motors without the use of permanent magnets.

BRIEF DESCRIPTION OF THE DRAWINGS

FIG. 3A is a side view of an illustration of an embodiment of resonant field exciter using a pot core axial rotary transformer.

FIG. 3B is an end view of the embodiment of FIG. 3A.

FIG. 4A is a side view of an illustration of an embodiment of resonant field exciter using a radial rotary transformer.

FIG. 4B is an end view of the embodiment of FIG. 4A.

FIG. 6 is a block diagram of the elements of the device of the invention able to be connected to a wound field synchronous rotor.

Figure 1:
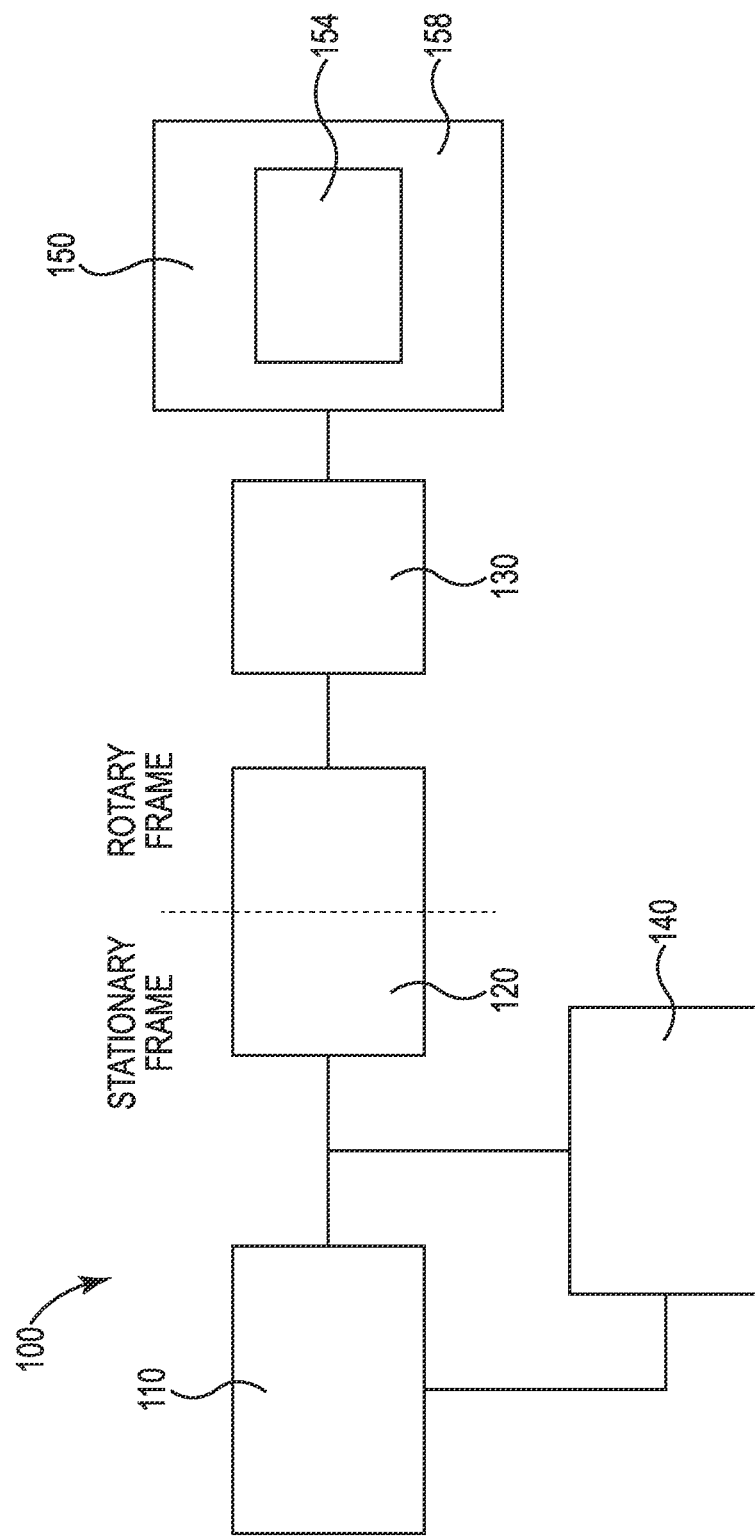
FIG. 1 is a block diagram of the elements of the device of the invention connected to a wound field synchronous machine.

While the invention is amenable to various modifications and alternative forms, specifics have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF SOME EMBODIMENTS OF THE INVENTION

The invention is a unique combination of known motor technology, power supply technology, and digital and software technology to result in novel wound field synchronous motor or wound field synchronous generator machines. These machines and devices used to make the machines operate or able to operate at power levels of greater than 10 HP with less expensive controls than current wound field synchronous machines and at variable speeds. These machines and devices used to make the machines also operate or are able to operate at power levels on the order of 10 HP or less without rare earth rotor magnets. These machines and devices used to make these machines replace low energy efficiency induction motors and generators used at all power levels. The efficiency of machines of the invention and machines made with devices of the invention is at least 95 percent compared with efficiencies of less than 70 percent for induction machines.

The wound field synchronous machine of the invention and device of the invention used to make a wound field synchronous machine represent the convergence of 150 years of motor technology, 50 years of power supply technology and 30 years of software engineering to make a novel, unobvious and beneficial new apparatus. Each of these areas will now be discussed to provide context to the invention.

Motor Technology

In a 2006 study the IEEE reported that 60% of the electrical energy in the United States was consumed by motors and that the vast majority of those motors were induction motors operating at 70% efficiency or less. In 2008 legislation was passed, to take effect in 2010 that legally raised the bar on motor efficiency, effectively making the most inefficient and least expensive induction motors illegal.

Prior to this legislation, motors with the lowest acquisition price, and low efficiency, were most attractive. After the legislation, much more attention was paid to the total cost of ownership of a motor. For a motor running 24/7 the energy costs over the motor's lifetime could be 10 to 20 times the initial cost of the motor.

In the motor industry, motors with different efficiencies are classified differently. The most efficient class, super premium, is dominated by motors containing permanent magnets. Partly because of efficiency legislation throughout the world and partly because of expanding markets for these motors, the market for this class of motor is expected to increase 9 fold between 2011 and 2017.

This has caused a number of growing pains. The most visible, although not the most serious, is the intentional cornering of the market for rare earth materials by China. By lowering the cost of the raw minerals, China effectively shut down all competing mining operations. Then, they raised the price or limited the availability of raw mineral, and made their cost of processed product (magnets etc.) more competitive, effectively moving their customers up the food chain. This, however, is a temporary diversion. Contrary to its name of "rare earths" rare earth elements are not all that rare. Substantial deposits exist on all continents, except Western Europe, where the elements were originally isolated (hence the "rare" denotation).

A more serious issue is that the processing of rare earth elements into magnets is a toxic and intricate process and the world simply can't support a rapid ramp up of rare earth magnet production. Long term this will establish a sustained premium for rare earth magnets, making permanent magnet motors and generators inherently more expensive than their magnet less cousins.

Higher efficiency induction motors have become known in recent years. These motors have achieved efficiencies of up to 81% from 70% for normal induction motors. Copper is used in the rotors instead of aluminum and the size of the rotors is increased in the motors to lower the eddy current loss by reducing the flex density. However, this results in heavier structures than those of normal efficiency induction motors of the same power rating and costs that approach those of permanent magnet motors of similar power rating.

But there are other ways to make an electric motor. The switched reluctance motor dates back to 1830. The series wound DC motor has also been around since the 1830's. The induction motor has been around since 1885. The wound field synchronous generator, known originally as the dynamo, has been around since the 1870's. Its cousin, the wound field synchronous motor, has been around almost as long. All of these motor types rely on one or more basic electromagnetic structures in which current is producing the magnetic field in the rotor of the motor. Only the permanent magnet motor requires no energy to maintain the magnetic field in the rotor; however this comes at a cost beyond that of the magnet itself.

In any permanent magnet motor, the field strength of the rotor magnet itself is fixed. This is both an advantage and a disadvantage. For applications that require substantial torque at zero speed, the presence of the magnetic field in the rotor makes meeting this requirement easy and efficient. However, the fixed magnetic field on the rotor means that rotation speed is limited by the source voltage at high speeds. Also, for applications where the motor speed needs to be variable, the full power to the motor must be controlled, with the attendant losses associated with such control.

In all of the non-magnet motor structures the field strength of the rotor field is adjustable, allowing for optimizing the motor operation. In the series wound DC motor, this involves passing current through a mechanical slip ring, with adverse mechanical and maintenance implications. In the switched reluctance motor, the magnetic field in the rotor is constantly changing, giving rise to eddy current losses, iron losses and a substantial radial force, which causes noise. Likewise, the induction motor relies on the rotor rotating slightly slower than the stator field, also inducing a changing magnetic field in the rotor and causing eddy current and iron losses. The wound field synchronous motor does not exhibit a changing magnetic field in the rotor so there are no eddy current or iron losses. Also, the wound field synchronous motor of the invention without any magnets comes close to the efficiency performance of the permanent magnet motor.

Wound field synchronous motors are currently limited to power levels of 10 HP and above, are primarily driven at speeds synchronous with the supplying power grid, and are used in stationary applications and in large stationary and portable generator applications. This is because power must be provided to the moving rotor to excite the field. The techniques currently used to do this involve slip rings, low frequency induction or fixed frequency induction techniques, all of which involve maintenance issues, substantial size, or mechanical precision constraints, and are only economically justifiable at higher shaft output levels.

The emergence of electric traction applications in automobile and industrial applications has led to the development of high horsepower permanent magnet and induction motor/generator machines. In the case of the permanent magnet motor/generator, possible fault conditions exist where the magnetic rotor can continue to rotate driven by external mechanical energy. This generates hazardous conditions. In the case of the induction traction motor/generator, low speed high torque operation is particularly inefficient due to high AC iron and eddy current losses in the rotor. Wound field synchronous motors are not currently used in these applications because of the current limitations in providing power to the rotor winding mentioned above.

A method to economically provide field power to the rotor of a wound field synchronous machine in general would allow smaller more cost effective motors and generators of this class for all applications. In addition, a method to economically provide field power to the rotor of a wound field synchronous motor at power levels of 10 HP or less would allow this motor type to compete with permanent magnet motors. The cost trajectories of the permanent magnet motors and the higher efficiency induction motors are increasing while the cost trajectory of the wound field synchronous motor is decreasing.

Power Supply Technology

For the past 50 years, power supply technology has concentrated on converting conventional grid power, battery power or generator power to isolated low voltages to run solid state circuits. Power levels ranged from milliwatts to kilowatts and development goals were lower cost, smaller size, and high efficiency.

All isolated power supplies rely on a transformer to electromagnetically transfer energy from the source power to the isolated load. The size of a transformer increases with the power level and decreases as the operating frequency is increased. Over five decades of a steady stream of research, improvements in materials and improved production techniques has driven power transformer design to operating frequencies above 1 MHZ and power densities above 100 watts/cubic inch.

As transformer technology improved, the other power handling components; transistors, diodes and passive components, also improved in terms of loss, size, speed, and cost to keep pace.

Circuit topologies also evolved, with concepts like resonant conversion that eliminated further loss factors by simply avoiding the operating conditions that produce them.

Digital and Software Technology

Digital and software technology came relatively late to power control, emerging in the early 1980's to provide improved performance to high accuracy but low powered applications like servos. By the late 1980's, digitally controlled power was being applied to all motor technologies. Today, techniques such as field vector control provide a high degree of speed and torque control at all power ranges, but with the inefficiency of having to tightly control all of the power flow to the motor.

The Invention

As stated earlier, there is a strong need for reducing the electrical power consumption in the U.S. At least 60% of the electric energy in the US is consumed by motors. At the moment there is a concerted effort to raise the efficiency of these motors, by adding electronic drives, making costly improvements to induction motors or by switching to permanent magnet motors. With a trend in the vehicle industry moving from gas-powered to electricity-powered motors, there is a need for electric motors that are less expensive than permanent magnet motors and have higher power efficiency than induction motors. These characteristics can be found in the wound field synchronous motors of the invention. Also, with the numerous motors operating at power levels of 10 HP and below, there is need to move away from relatively inefficient induction motors or pricey magnet-based motors.

The invention entails three aspects, a machine, device comprising a rotor winding able to be easily inserted into a machine, and a device able to be attached to a rotor winding.

First Aspect

The first aspect is an apparatus that comprises five elements. The first element is a wound field synchronous machine having a rotor winding and having no rotor magnets for torque production. In some embodiments, the wound field synchronous machine comprise a machine from the group of consisting of a motor, an AC generator, and a direct current (DC) generator. In some embodiments, the wound field synchronous machine is configured to operate at a power rating of 10 HP or less. In some embodiments, the wound field synchronous machine is configured to operate at a power rating of greater than 10 HP, some at power levels of greater than 50 HP, some at power levels of greater than 100 HP. And some at power levels greater than 150 HP. In some embodiments, the wound field synchronous machine operates in off line variable speed application such as a traction motor. In some embodiments the wound field synchronous machine operates as an on line or off line application such as a pump or compressor.

The second element is at least one square wave AC voltage generator having a voltage and driving frequency. It is possible for the generator to provide other voltage shapes such as a sinusoid or triangle, but the square wave is the simplest and most efficient to produce for the conveyance of energy.

The third element is at least one resonant field exciter in communication with the square wave AC generator. The resonant field exciter has (1) a rotary reference frame, (2) a static reference frame, and (3) a resonant circuit comprising in series a resonant capacitor and a rotary transformer with a variable leakage inductance. The resonant field exciter is configured to operate in a resonant mode at a resonant frequency of at least 50 kHz. In some embodiments, the apparatus includes only one square wave AC voltage generator and one resonant field exciter. In some embodiments, the rotating components of the resonant field exciter may be mounted on a round printed wiring assembly (PWA). For those embodiments, care must be taken to insure that this assembly is balanced since it rotates with the motor/generator shaft. In some embodiments, the resonant field exciter will include a rotary transformer, the leakage inductance of which, together with a capacitor forms a resonant circuit.

The fourth element is a controller device in communication with the square wave AC generator and the resonant field exciter. The controller device is configured to (1) measure the voltage and current into the resonant field exciter, (2) track the resonance frequency, and (3) adjust the driving frequency to substantially match the resonance frequency to maximize AC current transfer. The controller device is any that is configured to perform as indicated. This includes, for example, a microcontroller, an application specific integrated circuit, and a programmable logic device. In the embodiment with a microcontroller and a rotary transformer, it monitors the voltage and current to the rotary transformer primary and generates a variable frequency square wave signal at or near resonance that is passed to a power driver to drive the rotary transformer primary.

The fifth element is a rectifier in communication with the resonant field exciter and the wound field synchronous machine and configured to convert the AC current to DC current before it goes into the rotor winding of the wound field synchronous machine.

The efficiency of the apparatus of the invention is greater than that of induction machines configured to operate at similar power levels. Some embodiments are configured to have a power efficiency approaching that of premium magnet motors configured to operate at similar power levels. Some embodiments of the invention are configured to have an efficiency of at least 90%, some at least 92%, some at least 94% and some at least 95%.

In some embodiments of the invention, the resonant field exciter has further features. The rotary transformer has a stationary primary and a rotating secondary configured to form a gap that produces the variable leakage inductance. The resonant capacitor is in communication with the rotary transformer and configured to resonate with the variable leakage inductance at a frequency above 50 kHz. The controller device in these embodiments is further configured to generate a variable frequency square wave AC voltage signal to drive the rotary transformer primary.

In the above embodiment the following configuration holds. The primary of the rotary transformer is attached to the stationary reference frame of the machine. The secondary of the rotary transformer is attached to the rotating reference frame in such a way that the flux path around the transformer core does not change as the rotating reference frame moves. The gap between the primary and secondary of the rotary transformer permits the independent rotation of the secondary, contributes to determining the leakage inductance of the rotary transformer, and transfers energy magnetically from the stationary frame to the rotating frame. The resonating capacitor is connected in series with either the primary or secondary winding of the rotary transformer. Thus, the resonant circuit may be in either the rotary reference frame or the static reference frame. The value of this capacitor is selected to resonate with the leakage inductance of the rotary transformer at a frequency above 50 kHz. On the secondary side, one or more diodes are connected in a rectification configuration, the output of which is connected to the rotor field winding. In some embodiments a second capacitor is connected in parallel with the field winding to form a low pass filter.

Power to the rotor can be regulated or adjusted by various means known to the art. As an example, one technique is with a buck converter. However, known techniques from virtually any power supply technology can also regulate and adjust voltage to the rotor.

In both permanent magnet synchronous and wound field synchronous motors the rotating magnetic field on the rotor produces a back EMF voltage opposing the source that is proportional to the product of the magnetic field strength and the rotor speed. In permanent magnet synchronous motors, this not only limits the maximum speed of the motor on a given source, but also requires the power to the motor stator to be constantly under control. This is done by pulse width modulating the voltage to the motor stator windings at frequencies up to 20 kHz or higher and leads to additional losses in the drive electronics, significant electromagnetic interference (EMI) issues, and electrostatic effects such as bearing pitting.

In an embodiment of the first aspect of the invention, the rotor field and hence the back EMF voltage can be adjusted to nearly match the source voltage to eliminate the need to modulate the stator winding at all. Stator windings can be switched or commutated at a frequency equal to the number of poles times the speed of the motor of up to a frequency of several hundred Hz. This eliminates the PWM switching losses and reduces the EMI footprint and electrostatic effects by several orders of magnitude.

Second Aspect

The second aspect is an apparatus that also comprises five elements. The first element is a rotor winding for a wound field synchronous machine. The second element is at least one square wave AC voltage generator having a voltage and driving frequency. The third element is at least one resonant field exciter in communication with the square wave AC generator, the resonant field exciter having (1) a rotary reference frame, (2) a static reference frame, and (3) a resonant circuit comprising in series a resonant capacitor and a rotary transformer with a variable leakage inductance. The resonant field exciter is configured to operate in a resonant mode at a resonant frequency of at least 50 kHz. The fourth element is a controller device in communication with the square wave AC generator and the resonant field exciter and configured to (1) measure the voltage and current into the resonant field exciter, (2) track the resonance frequency, and (3) adjust the driving frequency to substantially match the resonance frequency to maximize AC current transfer. The fifth element is a rectifier in communication with the resonant field exciter and the rotor winding for a wound field synchronous machine and configured to convert the AC current to DC current before it goes into the rotor winding when it is affixed to a wound field synchronous machine. In some embodiments, the rotor winding may be used in a retrofitting manner in place of the permanent magnet rotor of a synchronous permanent magnet machine or the squirrel cage of an induction machine. Some embodiments of this aspect are suitable for retrofitting into existing wound field synchronous machines. Elements of this aspect are similar to those discussed earlier.

Third Aspect

The third aspect is an apparatus that comprises four elements. The first element is at least one square wave AC voltage generator having a voltage and driving frequency. The second element is at least one resonant field exciter in communication with the square wave AC generator, the resonant field exciter having (1) a rotary reference frame, (2) a static reference frame, and (3) a resonant circuit comprising in series a resonant capacitor and a rotary transformer with a variable leakage inductance. The resonant field exciter is configured to operate in a resonant mode at a resonant frequency of at least 50 kHz. The third element is a controller device in communication with the square wave AC generator and the resonant field exciter and configured to (1) measure the voltage and current into the resonant field exciter, (2) track the resonance frequency, and (3) adjust the driving frequency to substantially match the resonance frequency to maximize AC current transfer. The forth element is a rectifier in communication with the resonant field exciter and configured to convert the AC current to DC current before it goes into a rotor winding of a wound field synchronous machine. This replaces current techniques such as, for example, replacing slip rings and low or fixed frequency induction devices now in use. Some embodiments of the third aspect are suitable for installing in a wound field synchronous machine during manufacture. Elements of this aspect are similar to those discussed earlier.

The various aspects of the invention can better be understood through several figures illustrating some embodiments of the invention. The same numbers will be used to designate the same elements. FIG. 1 is a block diagram of the elements of the device of the invention connected to a wound field synchronous machine. An apparatus (100) comprises a square wave AC voltage generator (110) that having a voltage and a driving frequency. Square wave AC voltage generator 110 is in communication with a resonant field exciter (120) having a stationary frame and a rotary frame, and that is in communication with a rectifier (130). A controller device (140) is in communication with both square wave AC generator 110 and resonant field exciter 120. Rectifier 130 is also in communication with a wound field rotor (154) and a stator (158). The communication with wound field synchronous machine 150 is with wound field rotor 154.

Figure 2B:
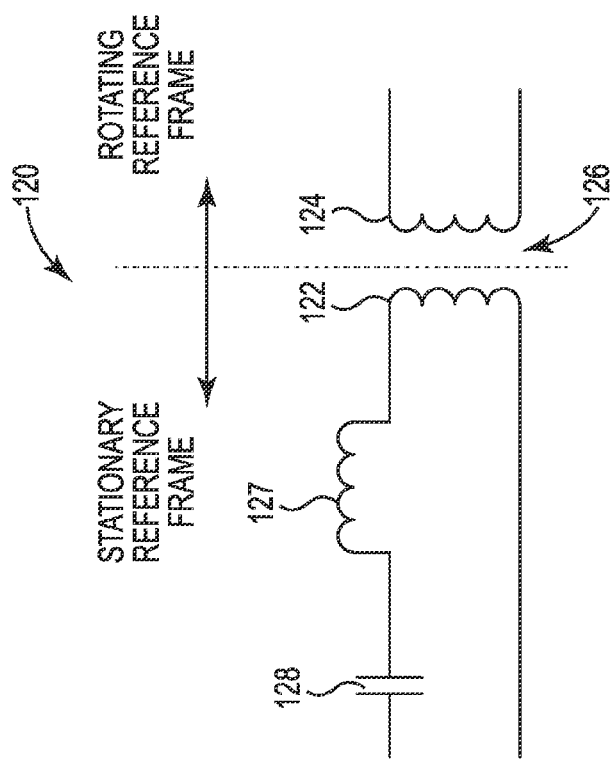
FIG. 2B is a schematic of an embodiment of the resonant field exciter showing the capacitor on the stationary reference frame
Figure 2A:
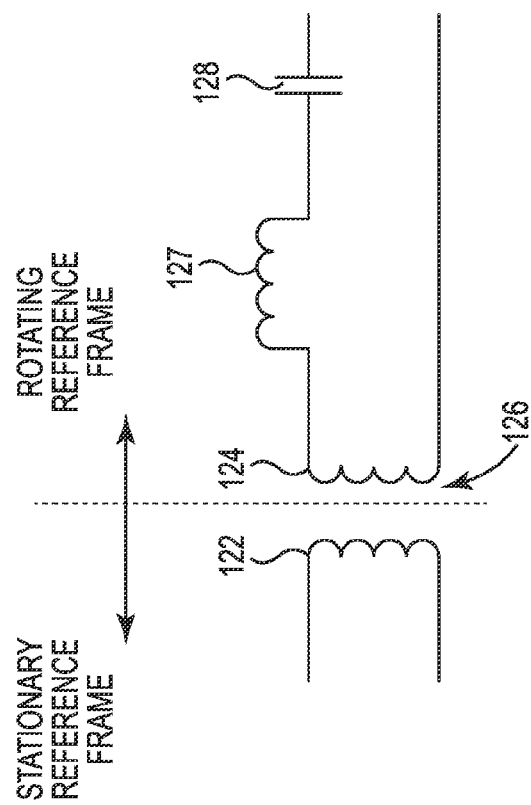
FIG. 2A is a schematic of an embodiment of the resonant field exciter showing the capacitor on the rotating reference frame.

FIG. 2A is a schematic of an embodiment of the resonant field exciter showing the capacitor on the rotating reference frame. Resonant field exciter 120 comprises a rotary transformer with a stationary primary (122), a rotary secondary (124), and a gap (126). The rotary transformer exhibits a variable leakage inductance (127) and is in series with a resonant capacitor (128) FIG. 2B is a schematic of an embodiment of the resonant field exciter showing the capacitor on the stationary reference frame. Resonant field exciter 120 comprises a rotary transformer with stationary primary 122, rotary secondary 124, and gap 126. The static reference frame of resonant field exciter 120 also comprises rotary transformer with variable leakage inductance 127 in series with resonant capacitor 128.

FIG. 3A is a side view of an illustration of an embodiment of resonant field exciter using a pot core axial rotary transformer configuration. An embodiment of a resonant field exciter device (200) is shown with a wound field rotor (210) with a wound field synchronous machine shaft (220) passing through it. A magnetic pot core for the secondary (230) with a rotary transformer secondary winding not visible, a magnetic pot core for the primary (240) with a rotary transformer primary winding not visible, and a PWA with rectifier and resonant capacitor (250) are in physical communication with wound field synchronous machine and in electrical communication with wound field rotor 210. All elements rotate except the stationary primary and associated magnetic core (240).

FIG. 3B is an end view of the embodiment of FIG. 3A along line 260 through rotary transformer secondary in magnetic pot core for the secondary 230. Illustrated are wound field rotor shaft 220 encompassed by rotary transformer secondary in pot core 230. Magnetic pot core for the secondary 230 surrounds a secondary winding (270). The cross section of the rotary transformer primary exhibits the same construction.

FIG. 4A is a side view of an illustration of an embodiment of resonant field exciter using a radial rotary transformer. Another embodiment of a resonant field exciter device (300) is shown with a wound field rotor (310) with a wound field synchronous machine shaft (320) passing through it. A magnetic core for the secondary (330) with a rotary transformer secondary (370), a magnetic core for the primary (340) with a rotary transformer primary (380) and a PWA with rectifier and resonant capacitor (350) are in physical communication with wound field synchronous machine shaft 320 and in electrical communication with wound field rotor 310. A secondary winding (370) and a primary winding (380) are shown around wound field synchronous machine shaft 320 and separated by a gap (390). All elements except rotary transformer primary 340 rotate.

FIG. 4B is an end view of the embodiment of FIG. 4A along line 360 through rotary transformer secondary in magnetic core 330 and rotary transformer primary in magnetic core 340. Illustrated are wound field rotor shaft 320 encompassed by rotary transformer secondary winding 370 in magnetic core 330 and by rotary transformer primary 380 in magnetic core 340. Secondary winding (370) and primary winding (380) are separated by gap 390.

Figure 5:
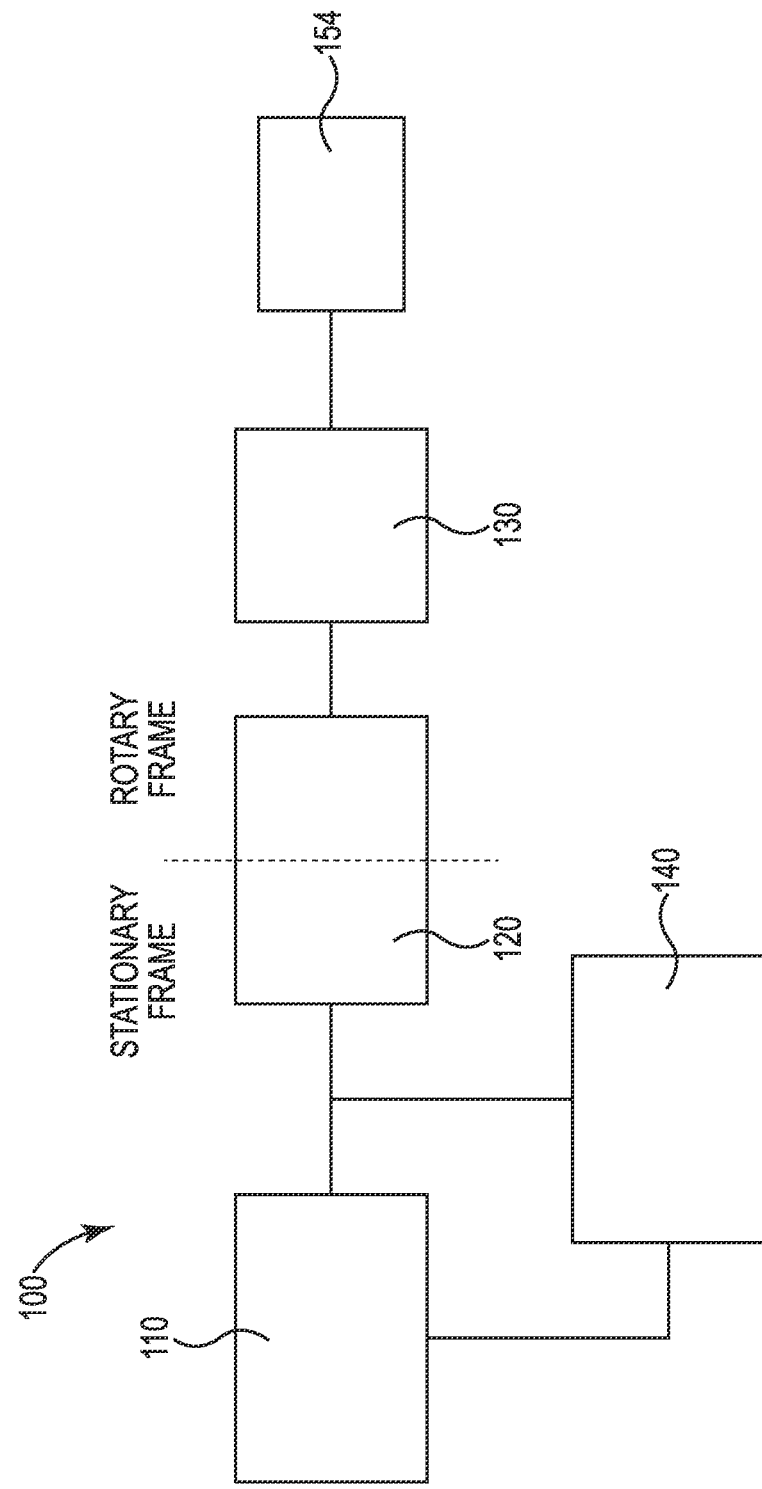
FIG. 5 is a block diagram of the elements of the device of the invention connected to a wound field synchronous rotor.

FIG. 5 is a block diagram of the elements of the device of the invention connected to a wound field rotor. This diagram is similar to that of FIG. 1 except a wound rotor (154) replaces wound field synchronous machine 150. Wound field rotor 154 is intended to replace the rotor in a permanent magnet or inductance motor or generator.

FIG. 6 is a block diagram of the elements of the device of the invention able to be connected to a wound field rotor. This diagram is similar to that of FIG. 1 except no wound field synchronous machine 150 is shown. This embodiment is intended to be attached to the existing wound field rotor of an existing synchronous machine such as, for example, a wound field synchronous generator.

The operating mechanism of one embodiment of the third aspect of the invention will be described. As described above, specific elements may be exchanged with others that perform similar functions. The resonant field exciter uses electrical resonance to transfer energy from the stationary reference frame of the motor stator to the rotating reference frame of the rotor to provide an adjustable DC current to the field winding. The microcontroller (1) monitors both the rotary transformer primary current waveform through a current sensor or current transformer and the voltage to the rotary transformer primary, and (2) adjusts the frequency of the square wave driving the rotary transformer primary to be at or just below resonance. This not only reduces the switching losses in the primary driving circuitry to a minimum, but also results in the most efficient transfer of energy to the rotary transformer secondary. The rectifier diodes convert the resonant AC current in the secondary to DC to feed the field winding. In some embodiments, the microcontroller also controls the output voltage of the square wave AC generator to maintain a desired current level in the rotor field. Other embodiments operate in a similar manner.

Other modifications and changes made to fit particular operating requirements and environments will be apparent to those with ordinary skill in the art. Thus, the invention is not considered limited to the embodiments discussed for purposes of disclosure and covers all changes and modifications that do not constitute departures from the true spirit and scope of this invention.

What is cclaimed is:

1. An apparatus, comprising,
a wound field synchronous machine having a rotor winding and having no rotor magnets for torque production;
at least one square wave AC voltage generator having a voltage and driving frequency;
at least one resonant field exciter in communication with the square wave AC generator, the resonant field exciter having a rotary reference frame, a static reference frame, and a resonant circuit comprising in series a resonant capacitor and a rotary transformer with a variable leakage inductance, and the resonant field exciter is configured to operate in a resonant mode at a resonant frequency of at least 50 kHz;
a controller device in communication with the square wave AC generator and the resonant field exciter and configured to measure the voltage and current into the resonant field exciter, track the resonance frequency, and adjust the driving frequency to substantially match the resonance frequency to maximize AC current transfer; and
a rectifier in communication with the resonant field exciter and the wound field synchronous machine and configured to convert the AC current to DC current before it goes into the rotor winding of the wound field synchronous machine.

2. The apparatus of claim 1 wherein the wound field synchronous machine is configured to operate at a power level of 10 horsepower or less.

3. The apparatus of claim 1 wherein the wound field synchronous machine is configured to operate at a power level of over 10 horsepower.

4. The apparatus of claim 1, wherein there is one square wave AC voltage generator and one resonant field exciter.

5. The apparatus of claim 1 wherein the wound field synchronous machine is from a group consisting of an AC motor, an AC generator, and a DC generator.

6. The apparatus of claim 1 wherein
the rotary transformer has a stationary primary and a rotating secondary configured to form a gap that produces the variable leakage inductance;
the resonant capacitor is in communication with the rotary transformer and configured to resonate with the variable leakage inductance at a frequency above 50 kHz; and
the controller device is further configured to generate a variable frequency square wave AC voltage signal to drive the rotary transformer primary.

7. The apparatus of claim 1 wherein the efficiency of the wound field synchronous machine is at least 90 percent.

8. The apparatus of claim 1 wherein the resonant circuit may be in either the rotary reference frame or the static reference frame.

9. An apparatus, comprising,
a rotor winding for a wound field synchronous machine;
at least one square wave AC voltage generator having a voltage and driving frequency;
at least one resonant field exciter in communication with the square wave AC generator, the resonant field exciter having a rotary reference frame, a static reference frame, and a resonant circuit comprising in series a resonant capacitor and a rotary transformer with a variable leakage inductance, and the resonant field exciter is configured to operate in a resonant mode at a resonant frequency of at least 50 kHz;
a controller device in communication with the square wave AC generator and the resonant field exciter and configured to measure the voltage and current into the resonant field exciter, track the resonance frequency, and adjust the driving frequency to substantially match the resonance frequency to maximize AC current transfer; and
a rectifier in communication with the resonant field exciter and rotor winding for the wound field synchronous machine and configured to convert the AC current to DC current before it goes into the rotor winding.

10. The apparatus of claim 9 wherein the wound field synchronous machine is configured to operate at a power level of 10 horsepower or less.

11. The apparatus of claim 9 wherein the wound field synchronous machine is configured to operate at a power level of over 10 horsepower.

12. The apparatus of claim 9 wherein there is one square wave AC voltage generator and one resonant field exciter.

13. The apparatus of claim 9 wherein
the rotary transformer has a stationary primary and a rotating secondary configured to form a gap that produces the variable leakage inductance;
the resonant capacitor is in communication with the rotary transformer and configured to resonate with the variable leakage inductance at a frequency above 50 kHz; and
the controller device is further configured to generate a variable frequency square wave AC voltage signal to drive the rotary transformer primary.

14. The apparatus of claim 9 wherein the resonant circuit may be in either the rotary reference frame or the static reference frame.

15. An apparatus, comprising,
at least one square wave AC voltage generator having a voltage and driving frequency;
at least one resonant field exciter in communication with the square wave AC generator, the resonant field exciter having a rotary reference frame, a static reference frame, and a resonant circuit comprising in series a resonant capacitor and a rotary transformer with a variable leakage inductance, and the resonant field exciter is configured to operate in a resonant mode at a resonant frequency of at least 50 kHz;
a controller device in communication with the square wave AC generator and the resonant field exciter and configured to measure the voltage and current into the resonant field exciter, track the resonance frequency, and adjust the driving frequency to substantially match the resonance frequency to maximize AC current transfer; and a rectifier in communication with the resonant field exciter and configured to convert the AC current to DC current before it goes into a rotor winding of a wound field synchronous machine.

16. The apparatus of claim 15 wherein the wound field synchronous machine is configured to operate at a power level of 10 horsepower or less.

17. The apparatus of claim 15 wherein the wound field synchronous machine is configured to operate at a power level of over 10 horsepower.

18. The apparatus of claim 15 wherein there is one square wave AC voltage generator and one resonant field exciter.

19. The apparatus of claim 15 wherein the rotary transformer has a stationary primary and a rotating secondary configured to form a gap that produces the variable leakage inductance;

the resonant capacitor is in communication with the rotary transformer and configured to resonate with the variable leakage inductance at a frequency above 50 kHz; and the controller device is further configured to generate a variable frequency square wave AC voltage signal to drive the rotary transformer primary.

20. The apparatus of claim 15 wherein the resonant circuit may be in either the rotary reference frame or the static reference frame.

* * * * *